(12) United States Patent
Surendran et al.

(10) Patent No.: US 8,886,589 B2
(45) Date of Patent: Nov. 11, 2014

(54) PROVIDING KNOWLEDGE CONTENT TO USERS

(71) Applicant: Microsoft Corporation, Redmond, WA (US)

(72) Inventors: Arungunram Chandrasekaran Surendran, Sammamish, WA (US); Tarek Najm, Kirkland, WA (US); Phani Vaddadi, Issaquah, WA (US); Rajeev Prasad, Bothell, WA (US); Siva Mohan, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/896,128

(22) Filed: May 16, 2013

(65) Prior Publication Data

US 2013/0254199 A1    Sep. 26, 2013

Related U.S. Application Data

(62) Division of application No. 12/483,935, filed on Jun. 12, 2009, now abandoned.

(51) Int. Cl.
*G06F 7/00* (2006.01)
*G06F 17/00* (2006.01)

(52) U.S. Cl.
USPC ........... 707/600; 707/603; 707/769; 707/776; 707/790; 707/793

(58) Field of Classification Search
USPC ......... 707/600, 603, 769, 776, 790, 793, 794, 707/999.3, 999.5
See application file for complete search history.

(56) References Cited

U.S. PATENT DOCUMENTS

| | | | | | |
|---|---|---|---|---|---|
| 5,659,668 | A | * | 8/1997 | Misono et al. | 706/60 |
| 6,460,034 | B1 | * | 10/2002 | Wical | 707/999.005 |
| 7,953,694 | B2 | * | 5/2011 | Colossi et al. | 707/600 |
| 8,055,675 | B2 | * | 11/2011 | Higgins et al. | 707/769 |
| 2004/0015775 | A1 | * | 1/2004 | Simske et al. | 715/500 |
| 2006/0047632 | A1 | * | 3/2006 | Zhang | 707/3 |
| 2007/0055691 | A1 | * | 3/2007 | Statchuk | 707/102 |
| 2007/0219989 | A1 | * | 9/2007 | Faihe | 707/5 |
| 2008/0174100 | A1 | * | 7/2008 | Reeves | 283/70 |
| 2008/0306987 | A1 | * | 12/2008 | Chen et al. | 707/102 |

* cited by examiner

*Primary Examiner* — Hares Jami
(74) *Attorney, Agent, or Firm* — Joann Dewey; Peter Taylor; Micky Minhas

(57) ABSTRACT

Systems, methods, and computer-storage media for generating and providing knowledge content to users utilizing a web architecture that integrates information across data silos through a common, flexible data storage schema, such as a star or snowflake schema, are provided. Data from a content graph, a user activity graph, a social graph, and temporal data as it relates to each of the content graph, the social graph and the user activity graph, is stored in a knowledge content database utilizing the star schema. In this way, data from each of these formerly disparate sources may be accessed from a common, extensible application platform utilizing ontologies and pivot table functionality, thus providing smarter, more comprehensive knowledge in response to received user queries.

8 Claims, 4 Drawing Sheets

PROVIDING KNOWLEDGE CONTENT TO USERS

CROSS-REFERENCE TO RELATED APPLICATIONS

This application claims the benefit of and is a divisional application of U.S. application Ser. No. 12/483,935, filed Jun. 12, 2009 and entitled "Providing Knowledge Content to Users" which is hereby incorporated herein by reference as if set forth in its entirety.

BACKGROUND

Web data, such as information related to users of the internet, is currently stored in a number of discrete data silos. For instance, information related to a user's interaction with the internet is commonly stored separate from information related to that user's social networking information. Additionally, information that is private, such as that related to a user's e-mail account or transactional activities, is commonly stored separate from user activity data and user social networking information. Further, information comprising web data within the internet is commonly stored across different data silos. This non-integrated storage schema, combined with inadequate means for simultaneously accessing information from the multiple data sources, often results in incomplete responses to user queries. This, in turn, often results in users having to execute a plurality of queries in succession, followed by manually piecing together the responses to such queries, to obtain the information they are seeking.

SUMMARY

Embodiments of the present invention relate to systems, methods, and computer-storage media for generating and providing knowledge content to users utilizing a web architecture that integrates information across data silos through a common, flexible data storage schema, such as a star or snowflake schema. Data from a content graph, a user activity graph (e.g., user profile and web use data), a social graph (e.g., social networking data), and temporal data as it relates to each of the content graph, the social graph and the user activity graph, is stored in a knowledge content database utilizing the star schema. In this way, data from each of these formerly disparate sources may be accessed from a common, extensible application platform utilizing ontologies and pivot table functionality, thus providing smarter, more comprehensive knowledge in response to received user queries.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein, wherein.

DETAILED DESCRIPTION

Figure 1:
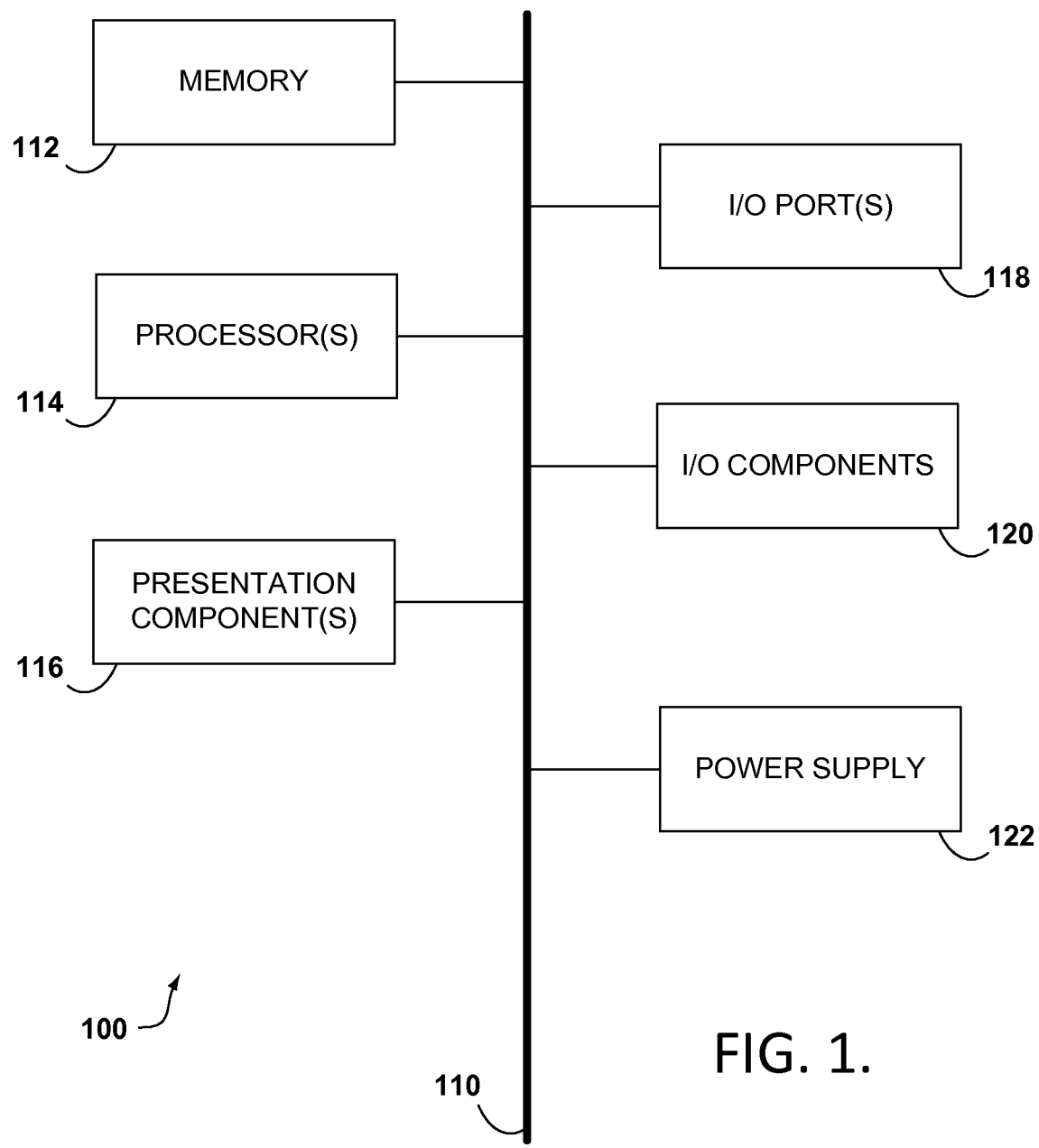
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate generally to systems, methods, and computer-storage media having computer-executable instructions embodied thereon that, when executed, perform methods for generating and providing knowledge content to users utilizing a web architecture that integrates information across data silos through a common, flexible data storage schema, such as a star or snowflake schema. Data from a content graph, a user activity graph (e.g., user profile and web use data), a social graph (e.g., social networking data), and temporal data (that is, data of or related to time) as it relates to each of the content graph, the social graph and the user activity graph, is stored in a knowledge content database utilizing the star schema. In this way, data from each of these formerly disparate sources may be accessed from a common, extensible application platform utilizing ontologies and pivot table functionality, thus providing smarter, more comprehensive knowledge in response to received user queries.

Accordingly, in one embodiment, the present invention provides one or more computer-storage media having computer-executable instructions embodied thereon that, when executed, perform a method for providing knowledge content to users in response to receiving information requests. The method includes receiving an information request from a user and processing the information request to extract one or more objects and/or attributes from the information request. The method further includes analyzing the objects and/or attributes from the information request utilizing a knowledge base to determine knowledge content relevant to the one or more extracted objects and/or attributes of the received information request. One way in which such analysis may take place is through the application of at least one ontology to the extracted objects and/or attributes. The knowledge base includes a knowledge content database that comprises at least a content graph, a social graph, a user activity graph, and temporal data relating to each of the content graph, the social graph and the user activity graph. The data stored in association with the knowledge content database is integrated and stored in a common, flexible data storage schema, e.g., a star or snowflake storage schema. Still further, the method includes generating a response to the received information request, the response including the determined relevant knowledge content, and transmitting the response to the user.

The relevant knowledge content comprises information derived from the knowledge content database that has at least one pivot applied thereto.

In another embodiment, the present invention provides a system having a processor and one or more computer-readable storage media for accessing knowledge content. The system includes a data collection component, a data processing component and a knowledge base. The data collection component is configured for obtaining input data. The data processing component is configured for analyzing the obtained input data and extracting information there from. The knowledge base is configured to receive the information extracted from the input data and output knowledge content relevant to the input data, and includes a knowledge content database that is configured to store at least a content graph, a social graph, a user activity graph, and temporal data relating to each of the content graph, the social graph and the user activity graph in a common, referencing data storage schema (e.g., a star or snowflake storage schema). In embodiments, the system further includes one or more of at least one ontology, a dimensional index configured for allowing one or more pivots to be applied to the knowledge content across multiple dimensions, and an inferencing engine configured to at least one of analyze the knowledge content to determine first additional knowledge content and accept manual input of second additional knowledge content.

In yet another embodiment, the present invention provides one or more computer-storage media having computer-executable instructions embodied thereon that, when executed, perform a method for generating knowledge content. The method includes receiving a data reference (for instance, through a publisher feed) and extracting metadata from the data reference to determine at least one object and/or at least one attribute associated therewith. The method further includes analyzing the at least one object and/or at least one attribute utilizing a knowledge base to determine whether there is existing knowledge content relevant to the at least one object and/or at least one attribute. One way in which such analysis may take place is through the application of at least one ontology to the determined at least one object and/or at least one attribute. The knowledge base includes a knowledge content database that includes at least a content graph, a social graph, a user activity graph, and temporal data relating to each of the content graph, the social graph and the user activity graph. If it is determined that there is existing knowledge content relevant to the at least one object and/or the at least one attribute, the method further comprises determining whether the existing knowledge content is accurate in view of the at least one object and/or the at least one attribute. Depending upon the determination, in embodiments, relationships between the at least one object and other objects stored in association with the knowledge content database may be created, modified or eliminated. If, however, it is determined that there is not existing knowledge content relevant to the at least one object and/or the at least one attribute, the method further comprises determining whether any new knowledge content items are capable of being generated based on the at least one object and/or the at least one attribute. If new knowledge content items are capable of being generated, in embodiments, new relationships may be created between the at least one object and other objects stored in association with the knowledge content database. New knowledge content items are capable of being discovered through the user of one or more pivots applied to the knowledge content database.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as search requests, words appearing in documents available for retrieval in response to input search requests, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Embodiments of the present invention provide systems, methods, and computer-storage media having computer-executable instructions embodied thereon that, when executed, perform methods in accordance with embodiments hereof, for generating and providing knowledge content to users. The systems and method described herein utilize data warehousing principles to integrate information across formerly disparate data silos (e.g., a content graph, a social graph, and a user graph), as well as temporal data related to each of the content graph, social graph and user graph, into a common, flexible data storage schema, e.g., a star or snowflake schema, so that the data may be more easily accessed and smarter, more comprehensive knowledge may be provided in response to received user queries. In this way, a single, extensible application platform is created that supports the addition of multiple applications (for instance, analysis and reporting applications) without the need to create custom infrastructures.

Additionally, in accordance with embodiments hereof, pivot table functionality may be applied to the data such that the data may be navigated and accessed in more dynamic ways (as opposed to traditional query/response navigation), thus, in a sense, transforming the stored information from mere data into knowledge. For example, suppose a user submits a request for information related to a particular stock, Stock A. In a traditional web search, responses generated may include a current stock price, a listing of stocks in the same sector as Stock A, a history of the company corresponding to Stock A, or the like. Suppose, however, that the user's inquiry required a much less linear sort of answer. For instance, suppose the user really desired information about other companies recently in the news with the company corresponding to Stock A, or other companies, independent of sector, that have similar cost-to-earnings ratios to Stock A. In traditional web search, an answer to such a query would require the user to input a series of queries in succession and manually compile the information to get the answer he or she was seeking. However, a knowledge base in accordance with embodiments hereof, having integrated information across formerly disparate silos, coupled with the application of one or more pivots (whether discovered or manually input, as more fully described below) to the knowledge stored in association with the knowledge content database, the user may much more easily obtain an answer to the query.

As another example, suppose a user desires to determine how Company A did versus Company B in online sales in the second quarter of last year. Again, traditional web search would require the user to input a series of queries in succession and manually compile the information to get the answer he or she was seeking. However, a knowledge base in accordance with embodiments hereof, would permit the user to much more easily obtain the information being sought as pivots may be applied across multiple dimensions allowing the data to be collapsed and expanded in different ways to obtain knowledge from the data items stored in the knowledge content database.

Pivot table functionality applied to the knowledge content database, in accordance with embodiments hereof, permits not only the browsing of related objects stored in association with the knowledge content database but also the ability to establish specific lists that can subsequently be filtered based upon various refinements. In this context, "related" can have multiple meanings and relationships can both be discovered utilizing pivot tables and also stored utilizing pivot tables. Pivots may be defined by the user (that is, a user may submit his or her query with enough specificity that the manner in which to apply pivots to the data is specific and unambiguous), or pivots may be discovered. This discovery can happen in a number of ways. First, discovery can happen between entities of similar type. For instance, a relationship between company A and company B in the same sector may be established, creating a pivot based upon a similar entity. Second, discovery can happen between entities of different types that share a common characteristic. For instance, a user's portfolio may include a number of individual stocks. It may be discovered that a mutual fund that has a similar or better overall return over 1, 3 and/or 5 years to the user's portfolio. A relationship may then be created between the user's individual stock portfolio and the mutual fund, creating a pivot based upon a dissimilar entity.

Further, pivots may be discovered based upon word or phrase definitions as they apply to overall context. For instance, suppose a user desires to find a mutual fund that performs "better" than mutual fund X. Pivots may be created as they relate to areas that have been heralded as important by, for example, a series of financial experts, when analyzing performance of mutual funds. For instance, the plurality of pivots may comprise a fund prices, price-earnings ratio, and indicators of investor confidence in the funds. Further, as the user interacts with the funds provided in response to the information request, user activity information related to the interactions may be stored in association with the knowledge content database. This information may be analyzed to deduce inferences relating to the funds and the pivots provided. For instance, if a user indicates fund A is "better" than fund B, and that fund B is "better" than fund C, an analysis of the characteristics of funds A, B, and C may reveal that fund A has a higher price-earnings ratio than fund B, and that fund B has a higher price-earnings ratio than fund C. As a result, a user preference may be created to include the return of a price-earnings ratio in response to an information request from the user concerning which fund is "better" than another. The preference may refer to funds in a particular technology industry, or may refer to funds of any classification.

In accordance with embodiments of the present invention, such user preferences may be determined and stored via ontologies. An ontology, as utilized herein, is simply a structure for interpreting the world and defining semantics so that meaning may be applied to the data in the knowledge content database. Ontologies may be manually constructed and subsequently augmented using data from the knowledge content database (particularly as it changes over time) and/or may be auto-created through extraction of meanings from documents and subsequently manually refined. Any and all such methodologies, and any combination thereof, are contemplated to be within the scope of embodiments of the present invention. Once ontologies are created, it allows not only the ability to browse the data in the knowledge content database in different ways, but also the ability for relationships between data items to be discovered.

Applying data warehousing principles to integrate information across formerly disparate data silos (e.g., a content graph, a social graph, and a user graph), as well as temporal data related to each of the content graph, social graph and user graph, into a star or snowflake schema also permits the processing of various types of data: structured data, semi-structured data and unstructured data. Structured data may include, by way of example only, data in a traditional database wherein the information includes metadata and is referenced. For instance, data in an airline reservations system or certain types of social networking data (friends, interests, etc.) represent structured data sources. Unstructured data, on the other hand, are documents basically void of associated metadata referencing, unless the structure is implicit in the text itself and not explicitly referred to in the database. For instance, articles or other documents comprising a lot of text are often unstructured data. Semi-structured data, as it sounds, is a hybrid category. Semi-structured data is data that is mostly unstructured but includes some structured data (e.g., tables) embedded therein. Examples of semi-structured data include Security and Exchange Commission filings that are primarily text but include some tables and graphs embedded therein. Each of these types of data may be processed to determine various objects and attributes associated therewith that may then be utilized to create relationships with other objects and attributes across the various data sources, thus integrating all the data types and making them available for responding to user queries.

In accordance with embodiments hereof, the storage of information from a content graph, a social graph, and a user graph, as well as temporal data related to each of the content graph, social graph and user graph, into a star or snowflake schema in association with a knowledge content database, and applying one or more ontologies and pivot table functionality to such information, provides a common, extensible application platform that provides smarter, more comprehensive knowledge in response to received user queries. It also provides the ability to rank traditionally-discovered search results in different ways. For instance, instead of simply inquiring about movies that are playing "near" a particular user, that user may inquire about movies playing "near" him or her that his or her friends like.

Figure 2:
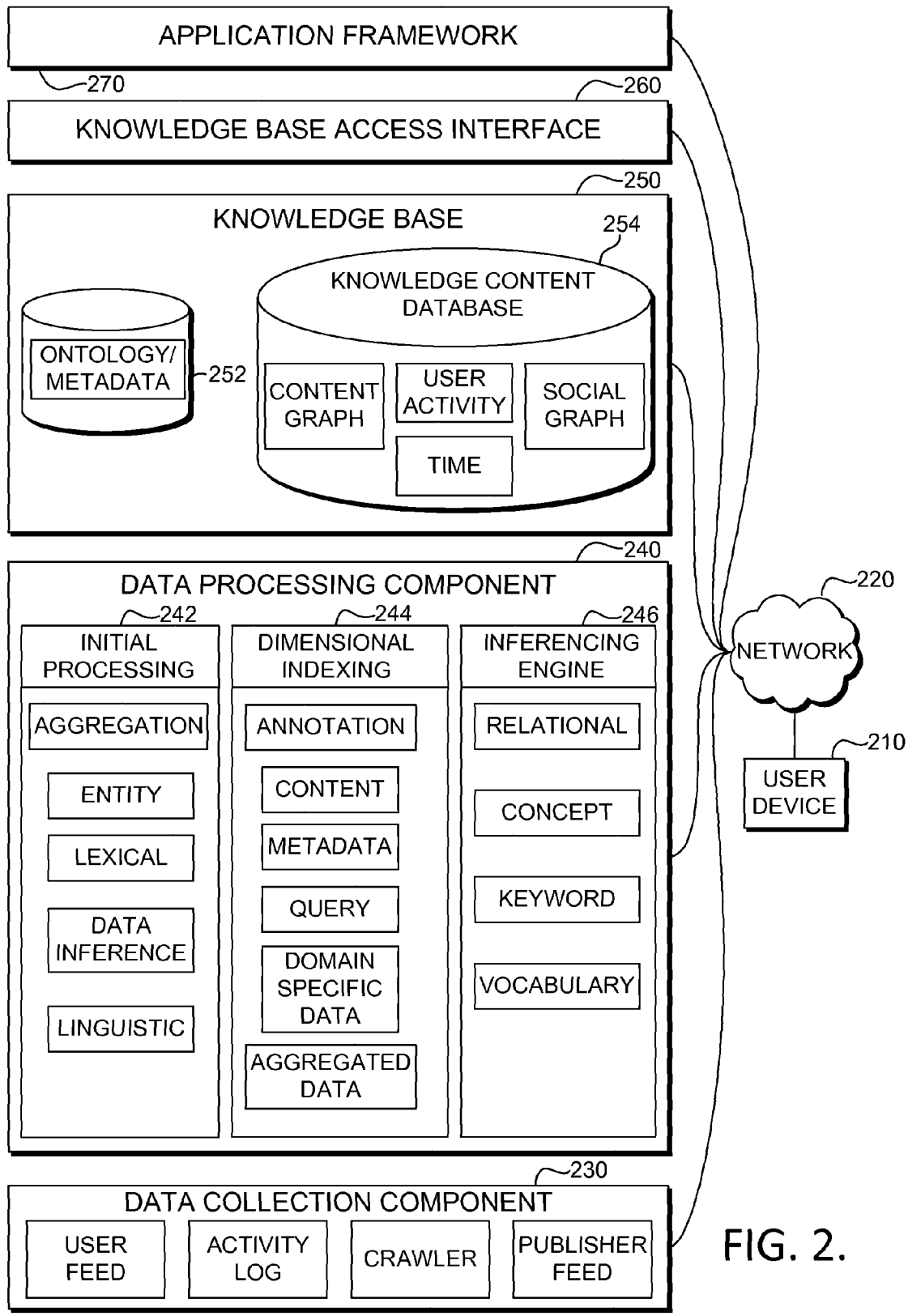
FIG. 2 is a schematic diagram of an exemplary computing system architecture for generating and accessing knowledge content, in accordance with an embodiment of the present invention.

With reference now to FIG. 2, a schematic diagram is illustrated showing an exemplary system architecture 200 suitable for use in generating knowledge content and providing such content to a user in response to receiving an information request, in accordance with an embodiment of the present invention. The system architecture 200 includes a user device 210, a data collection component 230, a data processing component 240, a knowledge base 250, a knowledge base access interface 260, and an application framework 270, all in communication with one another through a network 220.

The network 220 may be wired, wireless, or both. The network 220 may include multiple networks, or a network of networks, but is shown in FIG. 2 in more simple form so as not to obscure other aspects of the present invention. For example, the network 220 may include one or more wide area networks (WANs), one or more local area networks (LANs), one or more public networks, such as the Internet, and/or one or more private networks. In a wireless telecommunications network, components such as a base station, a communications tower, or even access points (as well as other components) may provide wireless connectivity in some embodiments. Although single components are illustrated for the sake of clarity, one skilled in the art will appreciate that the network 220 may enable communication between any numbers of user devices. Networking environments are commonplace in offices, enterprise-wide computer networks, intranets, and the Internet. Accordingly, the network 220 is not further described herein.

The user device 210 may be any computing device that is capable of web accessibility, for instance, the computing device 100 of FIG. 1. As such, the user device 210 might take on a variety of forms, such as a personal computer (PC), a laptop computer, a mobile phone, a personal digital assistance (PDA), a server, a CD player, a MP3 player, a video player, a handheld communications device, a workstation, any combination of these delineated devices, or any other device that is capable of web accessibility. In one embodiment, the user device 210 is a mobile device that utilizes a wireless telecommunications network to communicate. A mobile device may include, for example, a display(s), a power source(s) (e.g., a battery), a data store(s), a speaker(s), memory, a buffer(s), and the like.

The data collection component 230, the data processing component 240, the knowledge base 250, the knowledge base access interface 260 and the application framework 270 may reside in association with one or more computing devices, e.g., a server or collection of servers configured for accessing and collecting data and providing responses to received queries. It will be understood that, though components 230, 240, 250, 260 and 270 are illustrated as distinct components, one or more of the illustrated components 230, 240, 250, 260 and 270 may, in fact, be combined or may itself be comprised of multiple components. The illustrated system architecture 200 is but one exemplary configuration and is not intended to be so limiting.

The data collection component 230 is configured for obtaining input data for the system architecture 200. In embodiments, information may be obtained in a number of ways, including through the use of a user feed, an activity log, a web crawler, and a publisher feed. An example of a user feed is the entering of user information into a user profile. Another example of a user feed is the input of user preferences into a knowledge store. An additional exemplary user feed may include any other information that is input by a user at an input device, including but not limited to, a publisher feed. Using a publisher feed, publishers may submit structured, semi-structured and/or unstructured content to the data collection component for interpretation and analysis.

Similar to the user feed as a source of data, an activity log of one or more users also may be a source of data input into the system architecture 200. In addition to tracking the web activity of one or more users, the activity log may also be used to track the periodic updating cycles of websites or other indicia that are available from tracking activity occurring on a website.

Another way of gathering information is pulling data from the crawling of web documents. The manner and type of crawler may depend on user preferences, efficiency limitations, and/or the preferences of programmers inputting crawler limitations. It will be understood that other embodiments of crawler characterizations are within the scope of embodiments of the present invention, as well. Alternatively, or in addition, information may be obtained for the system 200 from other sources (e.g., may be pushed into the system). Data pushes may originate from one or more sources, such as structured data sources. For example, data may be updated to the system architecture 200 through periodic data feeds to systems from a company, or from site updates received from publishers as part of their publishing cycle. Data pushes may also originate from a community of contributors, wherein a user may upload personal data or documents.

Data received from one or more sources, such as those listed above, are analyzed by the data processing component 240 to extract relevant information. That is, the data processing component 240 is configured for analyzing obtained input data and extracting information there from. In embodiments, once data is received by the data collection component 230, the collected data may be processed by one or more data processing sub-components of the data processing component 240. The data processing component 240 illustrated in FIG. 2 includes an initial processing sub-component 242, a dimensional indexing sub-component 244 and an indexing engine 246 for processing collected or received data.

In embodiments, the initial processing component 242 is configured to analyze data and extract information using one or more data processing methods. In this regard, the initial processing component 242 may be used to analyze data and extract information from the three types of data described herein above: unstructured data, structured data, and semi-structured data. Unstructured data may comprise documents possessing a series of text lines. Documents that are included in the category of unstructured data may have little or no metadata. Structured data, on the other hand, may comprise a traditional database where information is structured and referenced. Semi-structured data may comprise a document such as a research paper or a Security and Exchange Commission filing, where part of the document comprises lines of text and part of the document comprises tables and graphs used for illustration. In the case of semi-structured data, the structured components of a document may be analyzed as structured data and the unstructured components of the documents may be analyzed as unstructured data.

Such data processing method(s) (e.g., a series of analytical components data may pass through) for processing data may be open and extensible. In this way, as an example only, one or more developers and communities may plug in new data extraction processes, entity detection methods, and classification analysis programs to enhance the quality and categories of information extracted from collected data. In embodiments, initial processing of data by the initial processing component 242 may include one or more of a lexical analysis, a linguistic analysis, and an entity extraction analysis. At or after an initial analysis, inferences may be made between aspects of the data received. As such, data from seemingly disparate sources may be integrated and new relationships may be inferred through the extraction of attributes, such as meaning and semantics, from the data. Inferences may be created through entity relationship extraction using documents being processed and data which is already stored in the knowledge base 250. Attribute extraction and inferences are more fully described below.

In embodiments, inferences may be formed as data is loaded into the system architecture 200. Such inferences may be discerned between new information and information that is already stored in the system architecture 200, for instance, in association with the knowledge base 250 (as more fully described below). In further embodiments, data stored in the system architecture 200 may be analyzed for inferences when new entries have been entered into the system architecture 200, particularly when new entries are added to the knowledge base 250 of the system architecture 200. As such, the system architecture 200 may be thought of as a learning system. Once inferences have been made from the data extracted, those inferences may be aggregated into a new data store, such as a knowledge content database 254 of the knowledge base 250.

In embodiments, the dimensional indexing sub-component 244 creates a multi-dimensional index or table that references components of the knowledge base 250. In embodiments, the dimensional indexing sub-component 244 is also responsible for abstracting data based on relational schema and ontology and unifying the data such that it may be exposed as a knowledge graph. Ontology may reside in the knowledge base 250. As such, the dimensional indexing sub-component may refer to ontology stored in the knowledge content database 254. The dimensional indexing sub-component 244 thus enables the mapping of the data and the ontology. Additionally, the dimensional indexing sub-component 244 enables the mapping of sub-areas such as metadata, content, annotation, query, domain-specific data and aggregated data. The dimensional indexing sub-component 244 enables the mapping of data and ontology through the use of objects and attributes, respectively. The graphs used in the system architecture 200 are constructed based on a flexible, extensible data storage schema, for instance, a star or snowflake schema. The star or snowflake schema is used to map objects. As such, the dimensional indexing sub-component governs when and how connections or relationships stored in association with the flexible star schema are generated, modified and/or broken. In embodiments, the dimensional indexing sub-component may also, or alternatively, index data based on keywords, vocabulary and/or concepts related to each data element and/or object.

Objects may represent a concept within a web document, or an object may represent a character in a play. Additionally or alternatively, an object may represent a mathematical theorem or a geographical location. Each object is associated with at least one reference, such as a web document. For the examples used above, a reference associated with a concept within a web document may be the web document itself; a reference associated with a character in a play may be the text of the play itself; a reference associated with the mathematical theorem may be a document chronicling the history of the mathematical theorem; and a reference associated with a geographical location may be a map of the location and/or a website associated with that geographic location (e.g., a website associated with the state of Missouri).

In addition to being associated with at least one reference, each object comprises at least one attribute. In embodiments, an attribute comprises a characteristic or a fact or data associated with an object. In the examples above, attributes associated with a concept in the web document may include a common definition of the concept, the number of people who have searched for that concept and selected that web document, or names of writers who have written on that concept (if any). Exemplary attributes associated with a character in a play may include the character's love interest (if any), the geographical origin of the character (if known), the author of the play, or generally agreed upon traits of the character. Exemplary attributes associated with a mathematical theorem may include the name of the person(s) who discovered the theorem, the date the theorem was discovered, and historical facts relating to the development and/or acceptance of the theorem. Exemplary attributes associated with a geographic location may include the history of the region, the language(s) commonly spoken in the region, and the longitudinal and latitudinal reference points of the geographic location.

The inferencing engine 246 is configured for making second degree inferences by analyzing inferences that may exist between data that is added to the knowledge base 250 and inferences that have been stored in the knowledge base 250 of the system architecture 200. As such, one aspect of the inferencing engine 246 may be to analyze the knowledge base 250 to search for new inferences that may be made when data is added to the knowledge base 250. In alternative embodiments, the inferencing engine 246 may search for new inferences in response to the receipt of an information request. The illustrated knowledge base 250 includes an ontologies/metadata component 252 and a knowledge content database 254. Though illustrated as a single database, it will be understood by those of ordinary skill in the art that the knowledge content database 254 may, in fact, be a collection of one or more databases, one or more of which may be stored in association with a server (not shown), network (not shown), other system components (e.g., user device 210), or other computing devices (not shown).

The illustrated knowledge content database 254 includes a content graph, a user activity graph and a social graph, as well as temporal data as it relates to each of the content graph, the user activity graph and the social graph. In embodiments, the user activity data graph may be constructed from information associated with user activity, for instance, the activity of registered users. User activity may include, by way of example only, user inputs, the number and types of page views, query activities, and annotation activities (for instance, where a user initiates an action that indicates a website is trustworthy). In embodiments, a user may be verified as being a registered user through the use of a security measure, such as a password or another form of authenticating the identity of the user, such as through the originating address of a user device (e.g., user device 210).

In embodiments, the social graph of the knowledge content database 254 includes objects associated with data relating to a user profile(s), user relationships with other users, and user preferences. In further embodiments, the social graph may include user profile information associated with participants of a social network. For example, a social graph may include all "friend" listings in an area, or it may include information relating to which users are friends of a user's friends ("friend of a friend" data). Data associated with users on a social networking website may include user demographic information, user psychographic information and user behavioral data.

In embodiments, the content graph of the knowledge content database 254 may include one or more attributes of entities, attributes comprising keywords, metadata, meanings, associations, properties, content, query, query results, annotation, and semantified data entities. Keywords entered into a query may be used to determine a best match within the knowledge base that corresponds best with the intended meaning behind the query. To do this, documents and queries are analyzed to discern the entities, relationships and facts contained in the documents. For example, a keyword phrase "President of the United States" may be understood as referencing knowledge related to a position of political office, but it may also be understood as referencing knowledge related to the country of the United States of America. Additionally, the keyword phrase may reference a series of time periods associated with past presidents, and/or it may reference a time period (e.g., 4 years) that comprises one term of a presidency. In order to present these relationships to the user, the keyword query may be translated to a query graph. The query graph may be a sub-graph that matches against a series of graphs in the knowledge database. The query graph may be presented to the user in response to a keyword query. The query graph may contain the type of references described above, and may be accessed using a pivot table functionality.

In embodiments, a keyword entity may comprise keywords and phrases that are indexed and managed by the indexing components of a core subsystem. Additionally, a metadata entity may comprise a set of data initialized by a system from known sources and enhanced by intelligent algorithms and collaborative annotation. Metadata may be managed by a metadata management component of a core subsystem.

A content entity may comprise information about content, as well as the content itself. The data collection component 230 and the data processing component 240 may analyze this content and store it in the system architecture 200, for instance, in association with the knowledge base 250. Information requests and responses to information requests may comprise data stored and processed in the same or a similar manner as other, unstructured contents. Extracted semantics may be used in various functionalities such as personalization of a knowledge content experience to an individual user. Recent responses to information requests may also be stored to enhance search performance and relevance. This data may be managed and used by a data presentation and enhancement component (not shown).

The knowledge content database 254 may further include an annotation component (not shown) having an ontology/metadata management component configured for managing metadata annotation. The knowledge database may additionally include a semantified data component (not shown) configured for storing semantified data in relational tables or in graph tables. Semantified data may be managed by the dimensional indexing sub-component 244 and/or other relational database managers (not shown).

The temporal data of the knowledge database 254 may comprise information related to the temporal nature (that is, of or related to time) of data included in other graphs. A time index may comprise an aggregation of time elements. For instance, a user may query how many minutes he has spent on the computer in the past thirty days. The time element may track each user activity entry related to the past 30 days, and may sum up the times related to deliver a final sum to the user in response to the user query. The time aspect may also be used to interpret aspects of a user query. For instance, a user may query: "Who was president of the United States when I was in college?" The data processing component 240 may access the social graph to determine user information entries related to when the user was at college, and then the data processing component 240 may access the temporal data to determine what time period the user was in college. This information may then be used to access the content graph and determine who was president during the given time period determined by reference to the temporal data of the knowledge database.

The ontology/metadata component 252 of the knowledge base 250 may serve as an ontology- and metadata-based index that is used to graph objects associated with graphical components of the knowledge content database 254. The objects may be extracted from the graphs comprising the knowledge content database 254, such as the content graph, the social graph, the user activity graph, and the temporal data. In embodiments, the ontology/metadata component 252 is enabled through the dimensional indexing sub-component 244 and is modified through the inferencing engine 246.

In embodiments, the ontology/metadata component 252 references data from each graph using a common referencing schema. The common referencing schema may be in the form of a flexible, extensible star schema. Through the use of a star schema, a set of data may be stored in a data table. From this initial data table, additional data may be referenced by snow flaking into other tables. For instance, a data table comprising a list of users who have visited a particular website may have data tables snow-flaked from each user comprising a list of websites that each user has viewed within a certain period of time. In this way, the snow-flaked tables may be considered dimensions of the original data table. While dimensions may be within the same type of data category, such as user activity, dimensions may also serve as a bridge connecting data across different types of data categories. For instance, in the example given above, a data table comprising an individual list of websites visited by a user may have a dimension of websites that have been identified by the individual as being a "favorite" website. This dimension may then lead to a data table of user preferences for the individual, which may then lead to a social profile of the individual. Through the dimensions listed in this embodiment, information about a website may lead to the preferences of an individual. As such, the use of the common referencing schema allows objects to reference disparate aspects of data collected for the knowledge content database 254 and stored in different graphs.

As described above, one way to navigate through a flexible star referencing schema is through the use of pivoting through data tables and dimensions of data tables. Through the use of this type of pivoting, a user and/or an application may navigate through a large amount of information collected from web content information, user activity information, social networking activity information, etc. The use of pivoting is distinct from the concept of drilling down, because the use of a pivot between data tables allows information to be drilled down as well as to be drilled up, so to speak, as information from a dimension may expand beyond an initial data table.

One example that may be used to distinguish the use of a pivot table over a general search engine includes the way in which a search query is interpreted using the system architecture 200. Similar to prior methods of searching, a user may input a search query comprising one or more keywords. In prior methods, the search query is then matched against a set of documents on an inverted index. In embodiments of the present invention, the inverted index may be replaced by a more powerful "pivot table" to pivot around large numbers of objects. In contrast to a search results ranking, the relationship between objects on the knowledge graph may be increased if it is determined that those relationships are tied to the search query. The user may then be presented with results to his or her search query.

Information stored in association with the knowledge base 250, wherein access is provided to each of the content graph, the user activity graph, the social graph and the temporal data, information associated with such graphs being organized and indexed in accordance with the ontology/metadata component 252, may be referred to herein as "knowledge content." Such "knowledge content" is derived from formerly discrete content silos through a common, referencing data storage schema, with the application of one or more ontologies and pivot table functionality, such that the content is smarter and more comprehensive than content offered by prior art query-receiving and answering systems.

The knowledge base access interface 260 of the system architecture 200 may allow a user to access components of the knowledge base 250. Once the knowledge base 250 has been constructed, users may interact with the knowledge base access interface 260 through applications hosted on the application framework 270. The application framework 270 may allow users to access and query the knowledge base 250 by submitting information requests that are processed by the data processing component 240. Additionally, APIs may be used to allow developers to write applications that utilize the knowledge base 250. The new applications may then be used by users. In embodiments, users may use applications such as open APIs to access data in the illustrated system architecture 200.

In an exemplary embodiment of user interaction with the illustrated system architecture 200, the ontology/metadata component 252 may include a series of fifty objects representing each state of the United States of America (U.S.A.), where each object may have a common link to a separate object representing "U.S.A." In this example, a user may generate an inquiry as to the number of states in the U.S.A. that were east of the user's location in 1814. The inquiry may be generated, for instance, at user device 210. The user query may be received by the data processing component 240, where the query may be processed by the dimensional indexing sub-component 244. The user inquiry may be analyzed against the knowledge base 250 to access the user's social graph to determine the user's location. The knowledge base 250 may also be used analyze the inquiry based on ontology (using ontology/metadata component 252) to determine the user is requesting states that are entirely east of the user's location, e.g., states that are partially east and partially west would not count. The knowledge base 250 may then be used to analyze a content graph to determine a list of states that meet the criteria of the inquiry, with the knowledge graph referencing the temporal data of states as they were defined in 1814. The dimensional indexing sub-component 244 may identify an entry on the ontology/metadata component 252 that answers the user query. In response, the user may be returned with a list of states that were east of the user's location as of the year 1814. The response may also include pivots comprising information related to the states. For example, the pivots may include histories of the states (based on the user's inquiry being based in 1814), the governor of the states in 1814, and present-day directions of how to travel to each state.

In another embodiment, a user may request a listing of all states in the U.S.A., in which case the knowledge database may be analyzed to generate a responsive listing to the user query. In response, the user may be returned with a data table containing a list of the names of all fifty objects referring to the fifty states. Alternatively, the user may request only the states beginning with the letter "A." In response, again analyzing the knowledge base 250, the user may be returned with a listing of the objects possessing both an attribute of being a state in the U.S.A., as well as an attribute of: "Name starts with A."

Those skilled in the art will appreciate that embodiments of the present invention contemplate the presence of additional components and/or sub-components of the system architecture 200, and the components and/or sub-components may be combined with one another and/or separated into new components and/or sub-components.

Figure 3:
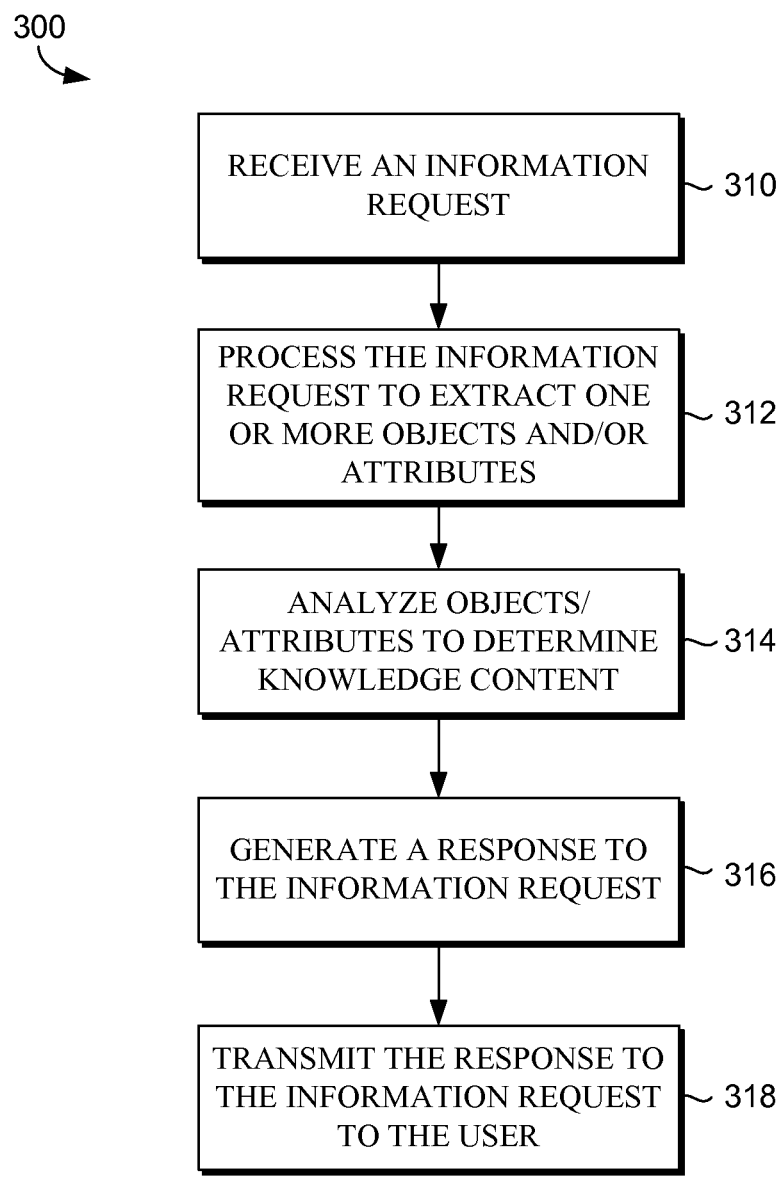
FIG. 3 is a flow diagram showing a method for providing knowledge content to users in response to receiving information requests, in accordance with an embodiment of the present invention.

Turning now to FIG. 3, an exemplary method 300 for providing knowledge content to users in response to receiving information requests is shown, in accordance with an embodiment of the present invention. Initially, as indicated at block 310, an information request is received from the user (e.g., via user device 210 of the system architecture 200 of FIG. 2). As indicated at block 312, the received information request is then processed to extract one or more objects and/or attributes there from (e.g., utilizing the data processing component 240 of the data system architecture 200 of FIG. 2). Such processing may include, by way of example only, one or more of a lexical analysis, a linguistic analysis, and an entity extraction analysis.

As indicated at block 314, the objects and/or attributes from the information request are analyzed utilizing at least one knowledge base (e.g., knowledge base 250 of the data system architecture 200 of FIG. 2) to determine knowledge content relevant to the one or more extracted objects and/or attributes of the received information request. As previously set forth, in embodiments, the knowledge base includes a knowledge content database (for instance, knowledge content database 254 of FIG. 2) including at least a content graph, a social graph, a user activity graph and temporal data relating to each of the content graph, the social graph, and the user activity graph. In embodiments, the data stored in association with the knowledge content database may be stored in a common, flexible storage schema, for instance, a star or snowflake schema. Additionally, in embodiments, the objects and/or attributes may be further analyzed using one or more of at least one ontology (e.g., stored in association with ontology/metadata database 252 of FIG. 2), at least one dimensional index (e.g., dimensional indexing sub-component 258 of FIG. 2) and at least one inferencing engine (e.g., inferencing engine 246 of FIG. 2).

As indicated at block 316, a response to the received information request is generated, the response including the determined relevant knowledge content including information derived from the knowledge content database (e.g., knowledge content database 254 of FIG. 2) having at least one pivot applied thereto. The response may be generated utilizing one or more applications, for instance, an application associated with the application framework 270 of the data system architecture 200 of FIG. 2. As indicated at block 318, the response to the information request is then transmitted to the user (e.g., via network 220 of FIG. 2).

Figure 4:
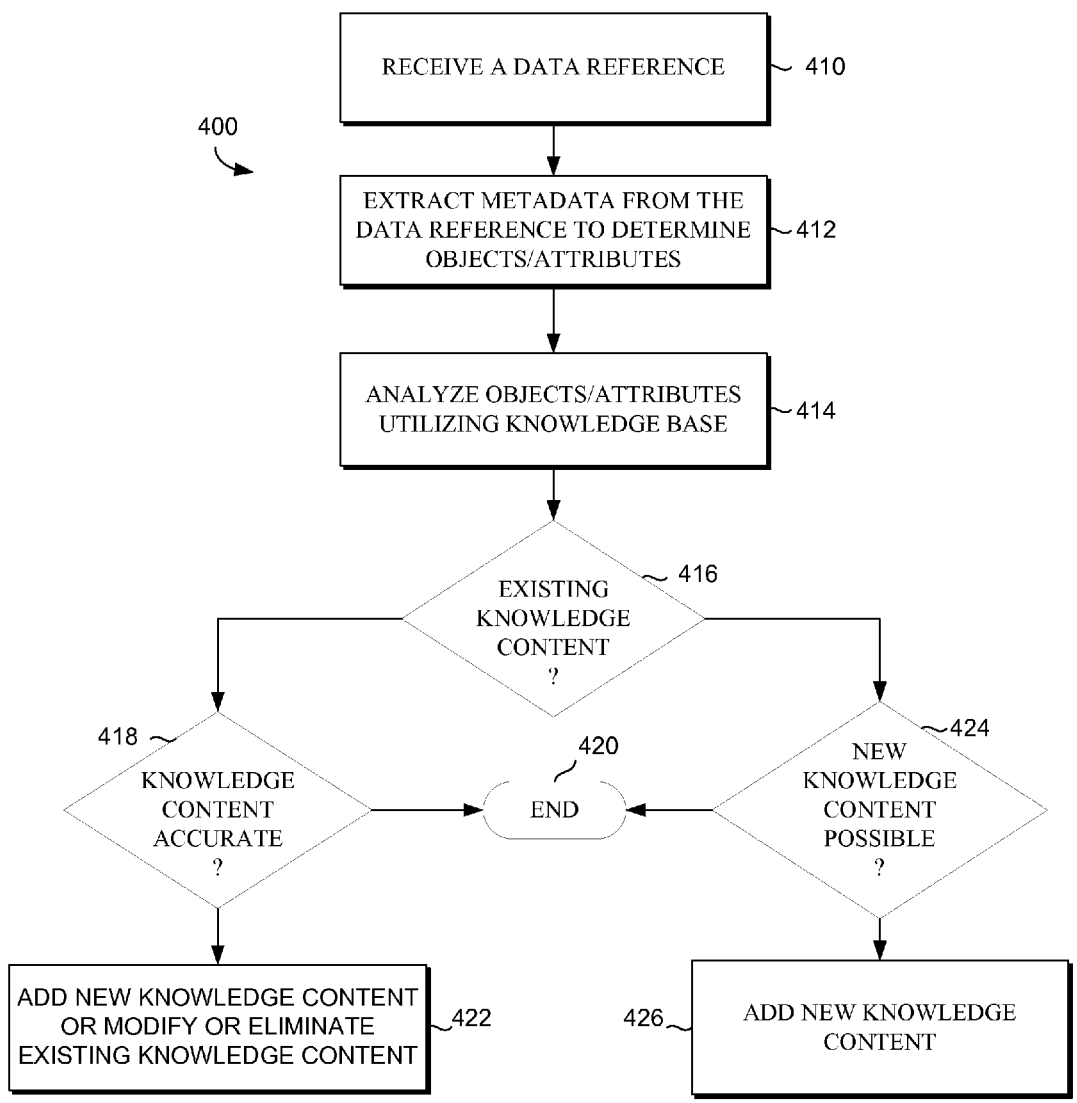
FIG. 4 is a flow diagram showing a method for generating knowledge content, in accordance with an embodiment of the present invention.

Turning now to FIG. 4, an exemplary method 400 for a method for generating knowledge content is shown, in accordance with an embodiment of the present invention. Initially, as indicated at block 410, a data reference is received (e.g., utilizing the data collection component 230 of the data system architecture 200 of FIG. 2). In embodiments, such data collection may utilize one or more of a user feed, an activity log, a web crawler, and a publisher feed.

As indicated at block 412, metadata is extracted from the data reference to determine at least one object and at least one attribute associated therewith (e.g., utilizing the data processing component 240 of the data system architecture 200 of FIG. 2). In embodiments, the at least one object may include, without limitation, one or more of a concept within the data reference and a concept associated with the data reference. Embodiments may include extraction of such metadata utilizing at least one of a lexical analysis, a linguistic analysis, an entity extraction analysis or an ontological analysis.

As indicated at block 414, the at least one object and/or at least one attribute are subsequently analyzed utilizing a knowledge base (e.g., knowledge base 250 described herein above with reference to FIG. 2) to determine (as indicated at block 416) whether there is existing knowledge content relevant to the object(s)/attribute(s). If it is determined at block 416 that there is existing knowledge content relevant to the object(s)/attribute(s), the method proceeds to block 418 wherein it is determined whether the existing knowledge content is accurate in view of the object(s)/attribute(s) determined from the data reference. This is indicated at block 418. If it is determined that the knowledge content is accurate, the method ends, as indicated at block 420. If, however, it is determined at block 418 that the knowledge content is not accurate (or is incomplete), new knowledge content may be added to the knowledge base and/or the existing knowledge content may be modified or eliminated, as indicated at block 422.

By way of example only, if it is determined that existing knowledge content relevant to an object determined from the data reference includes a first relationship between the object and another object stored in association with the knowledge content database, a second relationship between the object and/or attribute determined from the data reference and the other object may be determined and stored in association with the knowledge content database, thus adding knowledge content. By way of another example, a relationship between the object and another object stored in association with the knowledge content database may be found to be inaccurate and thus modified, the modified relationship being stored in association with the knowledge content database. By way of yet another example, a relationship between the object and another object stored in association with the knowledge content database may be found to be inaccurate and, accordingly, eliminated from the knowledge content database. Any and all such variations, and any combination thereof, are contemplated to be within the scope of embodiments of the present invention.

Returning to block 416 of FIG. 4, if it is determined that there is not existing knowledge content relevant to the object (s)/attribute(s), the method proceeds to block 424 wherein it is determined if any new knowledge content items are capable of being generated based on the object(s)/attribute(s). If no new knowledge content items are capable of being generated, the method terminates, as indicated at block 420. If, however, it is determined at block 424 that at least one new knowledge content item is capable of being generated, a new knowledge content item is generated, for instance, by establishing a new relationship between the object and at least one other object stored in association with the knowledge content database, and the new knowledge content item is stored in association with the knowledge content database. This is indicated at block 426.

As may be seen, embodiments of the present invention relate generally to systems, methods, and computer-storage media having computer-executable instructions embodied thereon that, when executed, perform methods for generating and providing knowledge content to users utilizing a web architecture that integrates information across data silos through a common, flexible data storage schema, such as a star or snowflake schema. In this way, data from formerly disparate sources may be accessed from a common, extensible application platform utilizing ontologies and pivot table functionality, thus providing smarter, more comprehensive knowledge in response to received user queries Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. One or more computer-storage media having computer-executable instructions embodied thereon that, when executed, perform a method for generating knowledge content, the method comprising:
   receiving a data reference;
   extracting metadata from the data reference to determine at least one object and/or at least one attribute associated with the data reference;
   analyzing the at least one object and/or at least one attribute utilizing a knowledge base to determine whether there is existing knowledge content relevant to the at least one object and/or the at least one attribute, the knowledge base including a knowledge content database, and the knowledge content database including at least a content graph, a social graph, a user activity graph, and temporal data relating to each of the content graph, the social graph and the user activity graph,
   wherein if it is determined that there is existing knowledge content relevant to the at least one object and/or the at least one attribute, the method further comprises determining whether the existing knowledge content is accurate in view of the at least one object and/or the at least one attribute,
   and wherein if it is determined that there is not existing knowledge content relevant to the at least one object and/or the at least one attribute, the method further comprises determining whether any new knowledge content items are capable of being generated based on the at least one object and/or the at least one attribute.

2. The one or more computer-storage media of claim 1, wherein receiving a data reference comprises receiving a data reference through the use of one or more of a user feed, an activity log, a web crawler, and a publisher feed.

3. The one or more computer-storage media of claim 1, wherein analyzing the at least one object and/or at least one attribute utilizing a knowledge base to determine whether there is existing knowledge content relevant to the at least one object and/or the at least one attribute includes applying at least one ontology to the determined at least one object and/or at least one attribute.

4. The one or more computer-storage media of claim 1, wherein if it is determined that there is existing knowledge content relevant to the at least one object, the method further comprises:
   determining that the existing knowledge content relevant to the at least one object includes a first relationship between the at least one object and another object stored in association with the knowledge content database; and
   determining a second relationship between the at least one object and the other object based upon the at least one object and/or at least one attribute associated with the data reference; and
   storing the second relationship in association with the knowledge content database.

5. The one or more computer-storage media of claim 1, wherein if it is determined that there is existing knowledge content relevant to the at least one object, the method further comprises:
   determining that the existing knowledge content relevant to the at least one object includes a relationship between the at least one object and other object stored in association with the knowledge content database; and
   modifying the relationship between the at least one object and the other object based upon the at least one object and/or at least one attribute associated with the data reference; and
   storing the modified relationship in association with the knowledge content database.

6. The one or more computer-storage media of claim 1, wherein if it is determined that there is existing knowledge content relevant to the at least one object, the method further comprises:
   determining that the existing knowledge content relevant to the at least one object includes a relationship between the at least one object and other object stored in association with the knowledge content database; and
   eliminating the relationship between the at least one object and the other object based upon the at least one object and/or at least one attribute associated with the data reference.

7. The one or more computer-storage media of claim 1, wherein if it is determined that there is not existing knowledge content relevant to the at least one object and/or the at least one attribute, the method further comprises:

determining that a new knowledge content item is capable of being generated based on the at least one object;

generating the new knowledge content item by establishing a new relationship between the at least one object and another object stored in association with the knowledge content database; and storing the new knowledge content item in association with the knowledge content database.

8. The one or more computer-storage media of claim 7, wherein the new knowledge content item is capable of being discovered through the use of one or more pivots applied to the knowledge content database.

* * * * *